United States Patent [19]

Kawamura et al.

[11] 4,124,882

[45] Nov. 7, 1978

[54] LIGHT SOURCE FOR MULTIPLE IMAGE PROJECTION DEVICE

[75] Inventors: Atsushi Kawamura; Yoshio Fukushima, both of Tokyo, Japan

[73] Assignee: Ricoh Company, Ltd., Tokyo, Japan

[21] Appl. No.: 780,209

[22] Filed: Mar. 22, 1977

[30] Foreign Application Priority Data

Mar. 25, 1976 [JP] Japan .................................. 51-32740

[51] Int. Cl.² ............................................... F21V 7/00
[52] U.S. Cl. .................................... 362/300; 362/346; 362/347; 362/350
[58] Field of Search ...... 240/1 EL, 41.35 C, 41.35 D; 362/300, 346, 347, 350

[56] References Cited

U.S. PATENT DOCUMENTS 4,007,985   2/1977   Yevick ........................... 240/1 EL X

*Primary Examiner*—Stephen J. Lechert, Jr.

*Attorney, Agent, or Firm*—Frank J. Jordan

[57] ABSTRACT

A microfiche on which a large number of characters are formed in an alternating arrangement is movable behind a mask in such a manner that at each position of the microfiche relative to the mask a desired group of characters is displayed through respective apertures in the mask. Lenses are disposed behind the apertures to project images of the characters therethrough onto a viewing screen. A reflection support member is disposed behind the microfiche and is formed with a stepped surface on which are disposed a plurality of concave reflectors, one reflector behind each lens. A lamp radiates light onto the reflectors, from which the light is reflected and focussed into the respective lenses, thereby illuminating the characters on the microfiche from behind. The radii of curvature and light receiving frontal areas of the reflectors differ in accordance with the distances of the reflectors from the lamp and the respective lenses.

12 Claims, 12 Drawing Figures

LIGHT SOURCE FOR MULTIPLE IMAGE PROJECTION DEVICE

BACKGROUND OF THE INVENTION

The present invention relates to a light source for a multiple image projection device.

Described in U.S. patent application Ser. No. 611,577 filed Sept. 8, 1975 which is assigned to the same assignee as this application is a "Character Display and Input Device" which typically serves as an input terminal for a computer, teletype or the like.

In parallel with the development of electric typewriters, computers, printers, ticket vending machines, inventory systems and the like has emerged the need for input devices which are adapted to enter a selected one of a tremendous number of data items into the system. A typical application to which the present invention is particularly suited is an input device for a system for transmitting both Japanese and Roman characters. Although there are only 26 Roman characters which can be easily input by a well known keyboard, the Japanese written language comprises katakana phonetic characters for writing non-Japanese words, hiragana phonetic characters for writing Japanese words and thousands kanji (Chinese) characters which are combined with the hiragana characters in writing Japanese words. In an input device for a system to transmit both Japanese and Roman characters, the number of characters which must be input into the system is generally as high as 3000 or 4000.

In the above mentioned prior patent disclosure, a large number of characters are formed on a sheet such as microfiche. The characters are further divided into classes such as a class of Roman alphabet characters, a class of Japanese hiragana characters, a class of Japanese katakana characters and a plurality of classes of Chinese characters arranged phonetically according to their leading syllables. Each class contains a predetermined number of characters. The characters are arranged in an alternating arrangement on the microfiche which is movable relative to a mask formed with apertures in such a manner that at each position of the microfiche all of the characters of a corresponding class are displayed through the respective apertures of the mask. Class selection means comprising one or more switches control drive means to move the microfiche so that the desired class of characters is displayed. Character selection means allow selection of the desired character and feed an electrical signal corresponding thereto to an electric typewriter, computer, teletype device or the like. The character selection means may comprise a light pen or switches provided to the respective apertures of the mask.

In one embodiment of said prior patent disclosure the microfiche is illuminated from behind by means of an optical fiber arrangement comprising an optical fiber for each aperture in the mask. More specifically, the optical fibers are bundled together at one end facing a light source. The other ends of the fibers face the characters on the microfiche behind the apertures in the mask. In this manner, light from the lamp is piped through the optical fibers to illuminate the respective characters from behind. Whereas this arrangement has proven to be quite effective in practical application, the manufacturing cost is rather high due to the operations required to fabricate and mount the optical fibers. This arrangement also limits the amount by which the thickness of the device can be reduced.

In another embodiment of said prior patent disclosure the optical fibers are respectively replaced by light emitting diodes. This arrangement also involves rather high manufacturing costs and limits the packing density of the characters on the microfiche.

SUMMARY OF THE INVENTION

In accordance with the present invention, a microfiche on which a large number of characters are formed in an alternating arrangement is movable behind a mask in such a manner that at each position of the microfiche relative to the mask a desired group of characters is displayed through respective apertures in the mask. Lenses are disposed behind the apertures to project images of the characters therethrough onto a viewing screen. A reflector support member is disposed behind the microfiche and is formed with a stepped surface on which are disposed a plurality of concave reflectors, one reflector behind each lens. A lamp radiates light onto the reflectors, from which the light is reflected and focussed into the respective lenses, thereby illuminating the characters on the microfiche from behind. The radii of curvature and light receiving frontal areas of the reflectors differ in accordance with the distances of the reflectors from the lamp and the respective lenses.

It is an object of the present invention to provide a light source for a multiple image projection device which overcomes the drawbacks of arrangements comprising optical fibers and light emitting diodes employed in the prior art.

It is another object of the present invention to provide a light source which enables the thickness of a multiple image projection device in which the light source is employed to be reduced.

It is another object of the present invention to provide a light source which enables a multiple image projection system in which the light source is employed to be fabricated at reduced cost.

It is another object of the present invention to provide a light source for a multiple image projection device which produces a higher intensity of illumination than arrangements comprising optical fibers or light emitting diodes.

It is another object of the present invention to provide a generally improved light source for a multiple image projection device.

Other objects, together with the foregoing, are attained in the embodiments described in the following description and illustrated in the accompanying drawing.

DESCRIPTION OF THE PREFERRED EMBODIMENTS

Figure 1A:
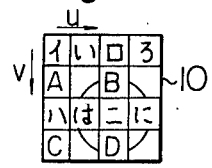
FIG. 1a is a graphic view of a portion of a microfiche on which are formed various characters.
Figure 1B:
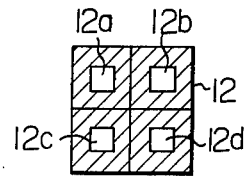
FIG. 1b is similar to FIG. 1 but shows a portion of a mask formed with display apertures.

While the light source of the invention is susceptible of numerous physical embodiments, depending upon the environment and requirements of use, substantial numbers of the herein shown and described embodiments have been made, tested and used, and all have performed in an eminently satisfactory manner.

The basic principle of the invention will now be described with reference to the drawing. In FIG., 1a is shown a microfiche sheet 10 on which are formed or printed 16 characters. The characters are of four different classes; Japanese katakana (phonetic alphabet for writing non-Japanese words), Japanese hiragana (phonetic alphabet for writing Japanese words) Roman alphabet and sections of a quadrisected circle. Reading from left to right, top to bottom, the characters are katakana "i", hiragana "i", katakana "ro", hiragana "ro", Roman "A", the upper left quadrant of a circle, Roman "B", the upper right quadrant of a circle, katakana "ha", hiragana "ha", katakana "ni", hiragana "ni", Roman "C", the lower left quadrant of a circle, Roman "D" and the lower right quadrant of a circle. It will be noted that there are four classes of characters, with each class containing four characters.

In FIG., 1b is shown a mask 12 formed with four apertures 12a, 12b, 12c and 12d. Although in the actual device the apertures are much larger than the characters and lenses are provided to magnifyingly project the characters through the mask onto a screen as will be described in detail below, for simplicity of presentation of the basic principle of the invention it will be assumed that only the sheet 10 and mask 12 are provided and that the characters are of the same size as the apertures and are visible therethrough.

Figure 2A:
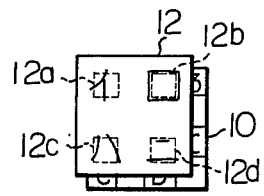
FIGS. 2a to 2d show the microfiche and mask in four different positions for explaining the basic principle of a multiple image projection device in which the present light source is incorporated.
Figure 2B:
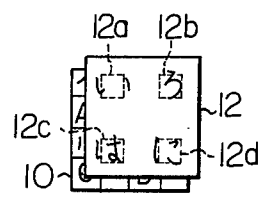
Figure 2C:
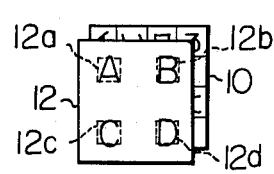
Figure 2D:
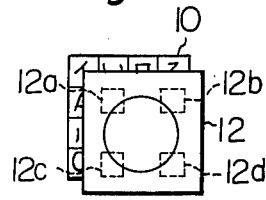

The mask 12 is movable relative to the sheet 10 to one of four predetermined positions corresponding to the four classes of characters. When the mask 12 is an upper leftward position relative to the sheet 10 as shown in FIG. 2a, the four katakana characters "i", "ro", "ha" and "ni" are visible through the apertures 12a, 12b, 12c and 12d respectively. When the mask 12 is in an upper rightward position relative to the sheet 10 as shown in FIG. 2b, the four hiragana characters "i", "ro", "ha" and "ni" are visible through the apertures 12a, 12b, 12c and 12d respectively. When the mask 12 is in a lower leftward position relative to the sheet 10, the four Roman characters "A", "B", "C" and "D" are visible through the apertures 12a, 12b, 12c and 12d respectively. When mask 12 is in a lower rightward position relative to the sheet 10, the upper left, upper right, lower left and lower right quadrants of the circle are visible through the apertures 12a, 12b, 12c and 12d respectively. Within the scope of the invention, the mask 12 may be held stationary and the sheet 10 moved relative thereto, the sheet 10 may be held stationary and the mask 12 moved relative thereto or both the sheet 10 and the mask 12 may be moved to produce relative movement therebetween to the desired relative position. In the embodiment of the invention which is described in detail below, the mask 12 is held stationary while the sheet 10 is moved relative thereto.

Figure 3:
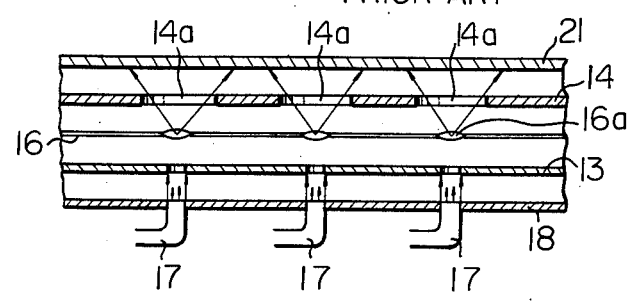
FIG. 3 is a fragmentary sectional view of an embodiment of a device disclosed in the above mentioned prior patent disclosure.
Figure 4:
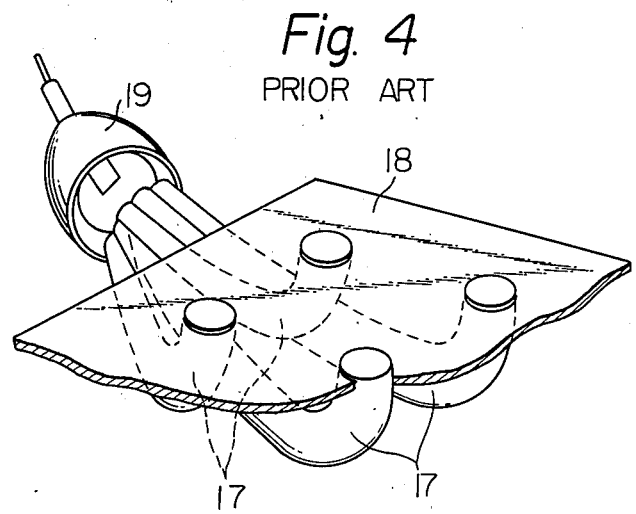
FIG. 4 is a fragmentary perspective view illustrating the light sourcing arrangement of said embodiment in the prior patent disclosure.

FIGS. 3 and 4 illustrate the above mentioned prior device in schematic form. A microfiche 13 is movable in two dimensions parallel to the surface thereof behind a mask 14 formed with apertures 14a. Lenses 16a are mounted in openings (no numerals) formed through a lens support plate 16 in such a manner that the lenses 16a are disposed directly behind the apertures 14a in the mask 14. Ends (no numerals) of optical fibers 17 face the microfiche 13 directly behind the respective lenses 16a, and are held in place by a mounting plate 18.

As shown in FIG. 4, the other ends of the optical fibers 17 are bundled together facing a lamp 19. With this arrangement, light from the lamp 19 is piped through the optical fibers 17 to illuminate respective characters on the microfiche 13 from behind. The lenses 16a project images of the respective characters through the respective apertures 14a of the mask 14 onto a translucent viewing screen 21 made of, for example, groundglass. The characters thereby are displayed on the screen 21 in a rectangular pattern of rows and columns. Although not shown, drive means position the microfiche 13 so that the desired group of characters is positioned behind the apertures 14a in accordance with the principle of FIGS. 2a to 2d. Furthermore, switch means are provided to the screen 21, although not shown, for selecting a desired displayed character to input an electrical signal representing said character into an associated computer, teletype or the like. A complete description of the drive and switch means is presented in the above mentioned patent disclosure.

Although the device illustrated in FIGS. 3 and 4 is quite satisfactory in operation, the optical fiber arrangement is expensive to embody and limits the amount by which the thickness of the device may be reduced.

Figure 7:
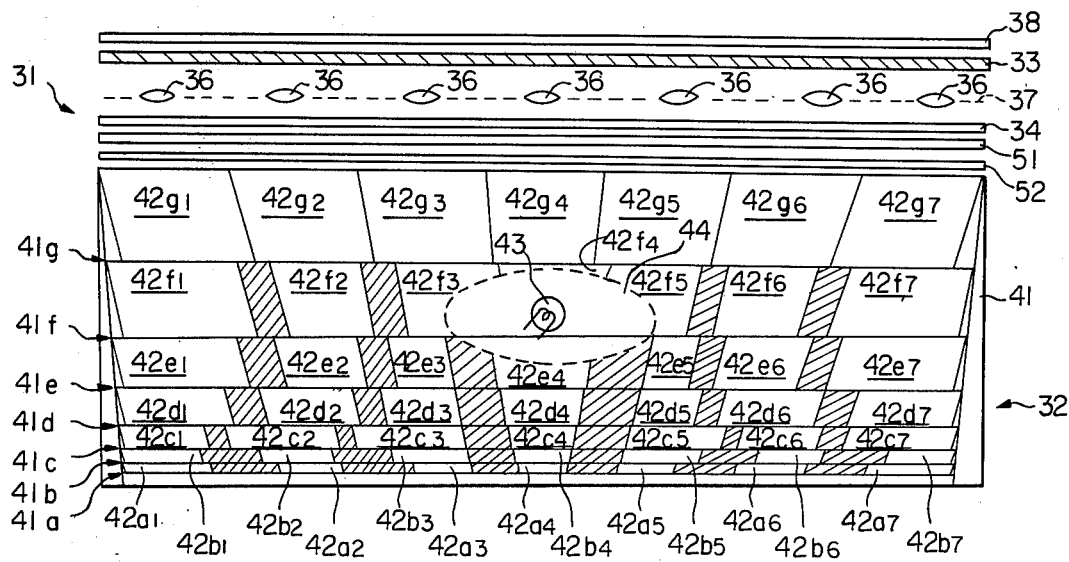
FIG. 7 is an elevational view from one end of the projection device.
Figure 5:
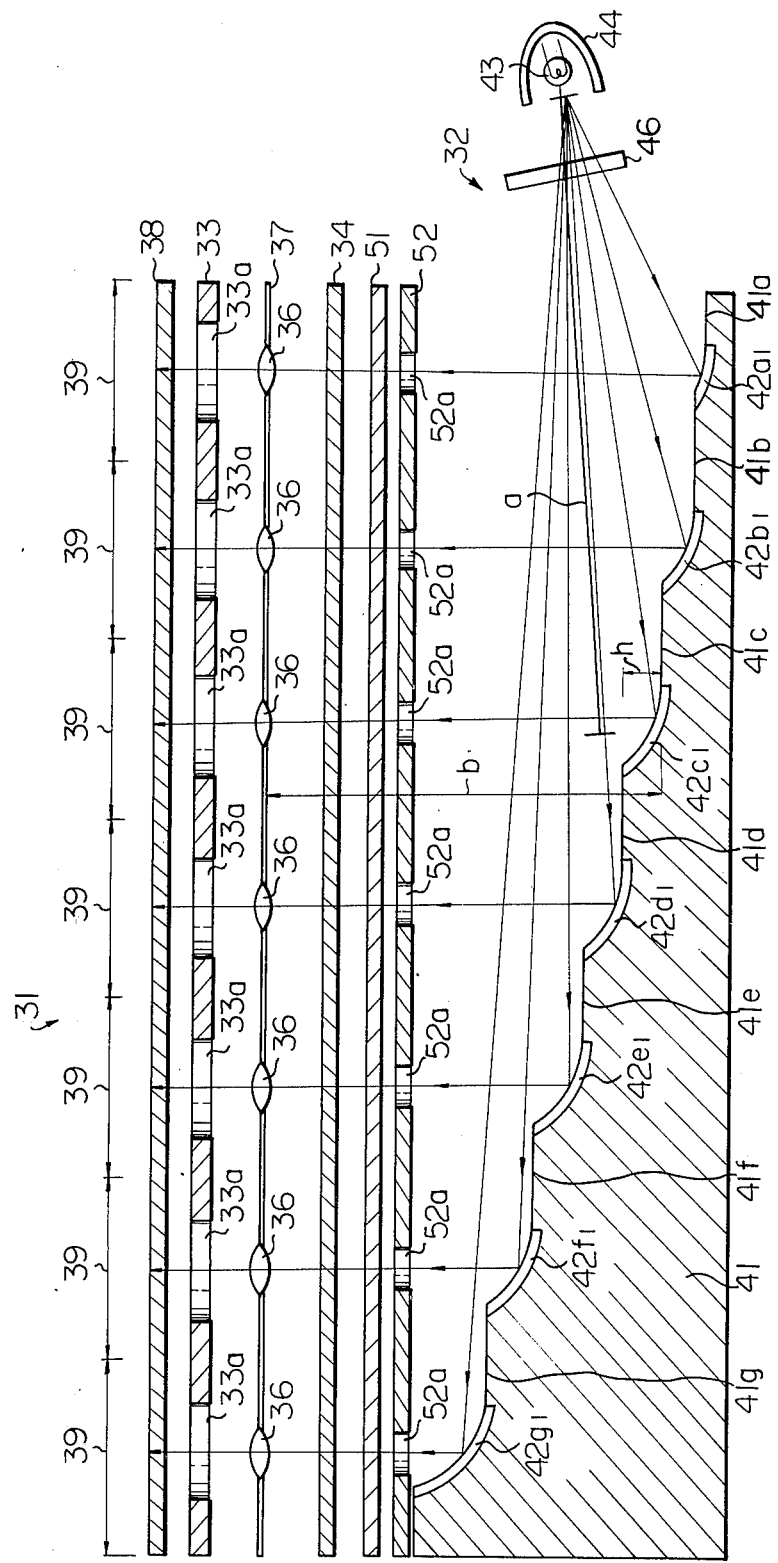
FIG. 5 is a sectional view of a multiple image projection device embodying a light source of the present invention.
Figure 6:
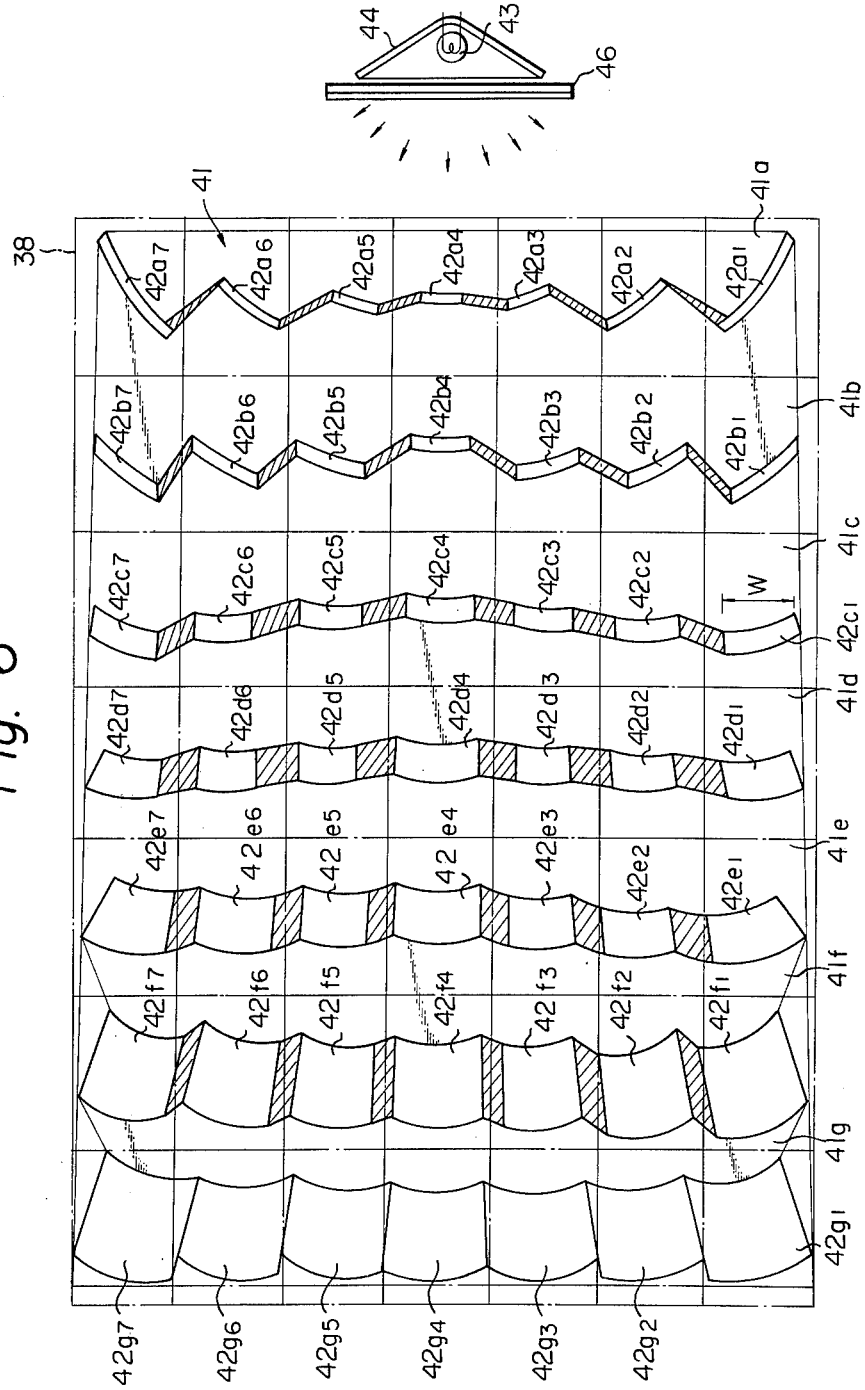
FIG. 6 is an overhead plan view of the light source.

This problem is overcome in a multiple image projection device 31 illustrated in FIGS. 5, 6 and 7 which embodies a light source 32 of the present invention. The device 31 comprises, in a manner similar to the prior art device, a mask 33 formed with apertures 33a behind which is movable a microfiche 34. The apertures 33a are formed in a rectangular pattern of 7 rows and 7 columns, for a total of 49 apertures 33a. Disposed behind each aperture 33a is a lens 36 supported by a lens mounting plate 37 for projecting an image of the respective character on the microfiche 34 through the respective aperture 33a onto a translucent viewing screen 38. The characters are thereby visible in 49 respective identical viewing areas on the screen 38 which are designated as 39.

The present light source 32 comprises a support member 41 having an upper surface (no numeral) formed of a light absorbing material. As viewed in FIG. 5, the upper surface of the support member 41 is formed with 7 steps 41a, 41b, 41c, 41d, 41e, 41f and 41g which rise from the right edge of the support member 41 to the left edge thereof. The upper surface of the support member 41 is thereby generally slanted relative to the microfiche 34 with the right end of the support member 41 being furthest from the microfiche 34.

As best seen in FIG. 6, seven mirrors or reflectors are provided on the step 41a of the support member 41 designated as 42a1 to 42a7. Similarly, reflectors 42b1 to 42b7, 42c1 to 42c7, 42d1 to 42d7, 42e1 to 42e7, 42f1 to 42f7 and 42g1 to 42g7 are provided on the steps 41b, 41c, 41d, 41e, 41f and 41g respectively. In FIG. 6, the viewing areas 39 on the screen 38 are indicated by phantom lines but not labeled for simplicity of illustration. The reflectors are collectively designated as 42, and it will be seen in FIG. 6 that there is one reflector 42 behind each viewing area 39.

A lamp 43 is provided adjacent to the right edge of the support member 41 as viewed in FIG. 5 and radiates light onto the reflectors 42, as indicated by unlabeled arrows which designate ray paths. From the reflectors 42, the light is reflected through the respective characters on the microfiche 34, lenses 36 and apertures 33a onto the viewing portions 39 of the screen 38. The reflectors 42 serve the function of the optical fibers 17 of the prior art device in that they illuminate the respective characters on the microfiche 34 from behind. A reflector 44 is provided in back of the lamp 43 and a heat absorbing transparent plate 46 is provided in front of the lamp 43.

It will be noted that the microfiche 34, lens mounting plate 37, mask 33 and viewing screen 38 are mutually parallel, with the lens mounting plate 37 serving as a target plane as will be described in detail below. The reflectors 42 are so shaped that light reflected therefrom is perpendicularly incident on the lenses 36.

The reflectors 42 have concave, preferably spherical surfaces which serve not only to reflect light through the microfiche 34 but focus images of the lamp 43 into the respective lenses 36 in the same manner as condensers in a conventional projector, thereby substantially increasing the intensity and clarity of the characters on the viewing screen 38. The plane of the lens support plate 37 thereby serves as a target plane into which the images of the lamp 43 are focussed by the reflectors 42. Since the various reflectors 42 are spaced by different distances from the lamp 43 and lens support plate 37, they necessarily differ in shape.

Taking the reflector 42c1 as an example, the light receiving frontal area thereof is equal to $w \times h$, where $w$ is the width of the reflector 42c1 facing the lamp 43 and $h$ is the height of the reflector 42c1 facing the lamp 43. In order for the same amount of light to be incident on each reflector 42, the frontal area of each reflector 42 must be proportional to the square of the distance from the respective reflector 42 to the lamp 43. For the reflector 42c1, $w \times h = K \times a^2$, where $a$ is the distance from the reflector 42c1 to the lamp 43 and $K$ is a constant. The same relation holds for all of the reflectors 42. This is based on the fact that the intensity of the light incident on each reflector 42 drops off with the square of the distance from the reflector 42 to the lamp 43. However, by increasing the light receiving frontal area in proportion to the square of the distance, the same amount of light is incident on each reflector 42.

In addition, the radius of curvature R of the reflector 42c1 is selected to be $R = 2ab/(a+b)$ where $b$ is the distance from the reflector 42c1 to the target plane or respective lens 36. This relation holds for all of the reflectors 42, and assures that each reflector 42 will focus an image of the lamp 43 into the respective lens 36. The present light source 32 thereby provides illumination of the microfiche 34 equivalent to 49 discrete condenser illumination systems.

Since the lamp 43 is not a point light source and the modification $b/a$ varies for the different reflectors 42, the illumination of the characters on the microfiche 34 may vary in some applications, producing local hot spots. This may be reduced by interposing a diffuser plate 51 between the reflectors 42 and the microfiche 34. The diffusing plate 51 may be uniform throughout its extent. Alternatively, the density of the diffusing plate 51 may vary in such a manner that densities of portions of the diffuser plate 51 are selected in accordance with amounts of light reflected thereto from the respective reflectors 42 so that amounts of light passing through the portions to the lenses 36 are equal.

Figure 8:
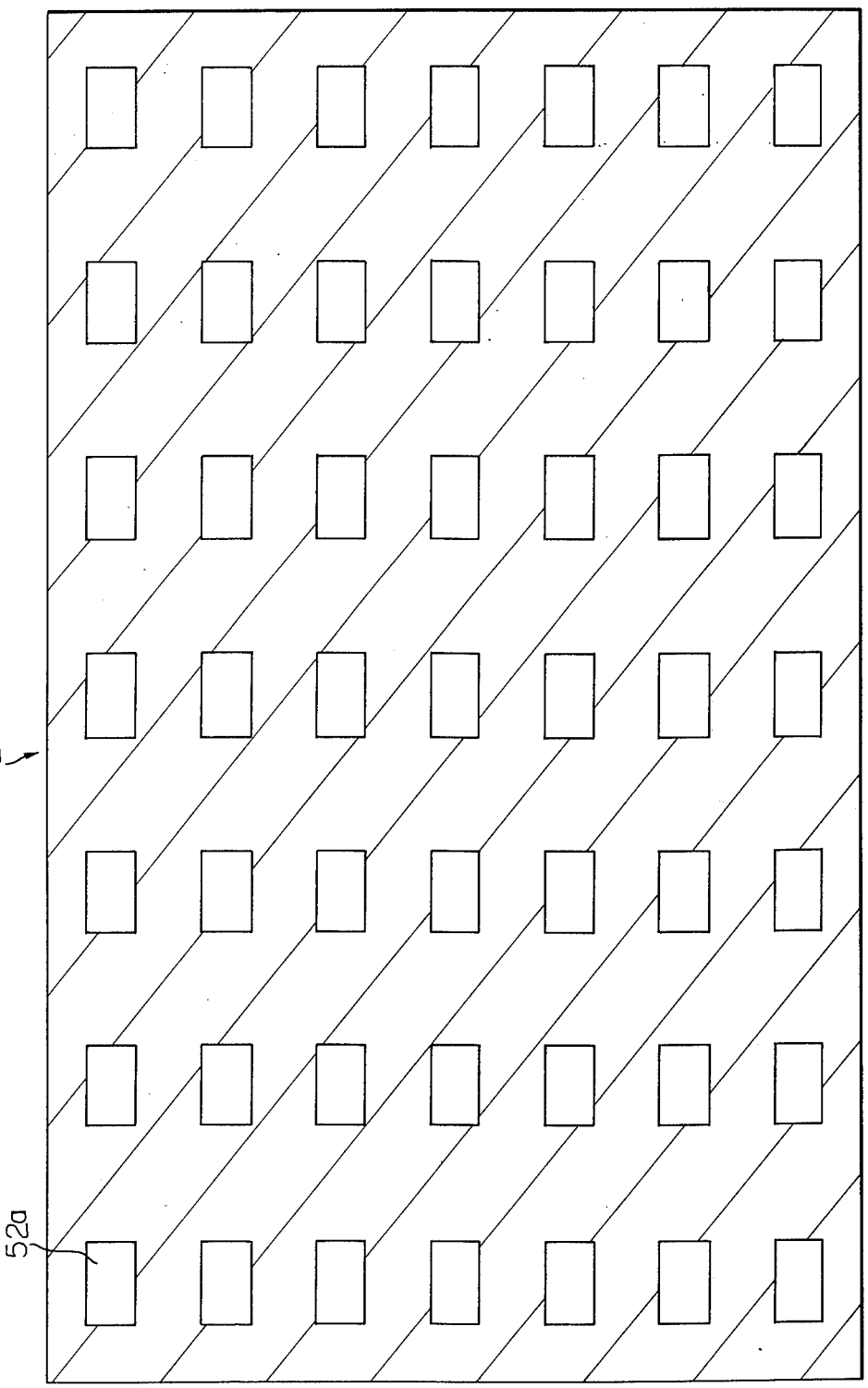
FIG. 8 is a plan view of an aperture plate of the present invention.

It is also possible to interpose an aperture plate 52 between the reflectors 42 and the microfiche 34, either singly or in combination with the diffuser plate 51. The aperture plate 52 is formed with 49 apertures 52a aligned with the light reflected therethrough from the respective reflectors 42 to the lenses 36. In the diffuser plate 52 as shown in FIG. 8, all of the apertures 52a are the same size. However, the areas of the apertures may be selected in accordance with the amounts of light reflected thereto from the respective reflectors 42 so that the amounts of light passing through the apertures to the lenses 36 are equal.

The reflector support member 41 may be molded out of a plastic material and the reflectors 42 formed thereon by a metallic deposition process. Alternatively, the support member 41 and reflectors 42 may be integrally formed of metal by a pressing process and non-reflecting portions painted black. Either process provides a high quality unit at low manufacturing cost.

In a typical embodiment of the device 31, the screen 38 was provided with 49 viewing areas 39 each being 32mm × 22mm. The lamp 43 was a 300W unit. In each of the viewing areas the light intensity was as high as 50,000 to 80,000 lx, and the intensity was quite uniform throughout the areas 39. The thickness of the entire device 31 was only about 40mm. In addition, it was found that even a substantial movement of the lamp 43 produced no visible change in the illumination of the screen 38. Thus, the present light source 42 is quite effective even if not manufactured to close tolerances.

In summary, it will be seen that the present light source replaces the prior art optical fiber and light emitting diode arrangements and provides lower manufacturing cost, a more compact devicee and increased illumination intensity. Various modifications will be possible for those skilled in the art within the scope of the present disclosure.

What is claimed is:

1. A light source comprising, in combination:
   a reflector support member having a surface slantedly facing a target plane, the surface being formed with a plurality of steps;
   a plurality of reflectors provided on the surface of the support member so as to be distributed on the steps; and
   a lamp disposed adjacent to an edge of the support member spaced furthest from the target plane for radiating light onto the reflectors, the reflectors being so shaped as to reflect light from the lamp to the target plane perpendicular to the target plane, the radii of curvature and light receiving frontal areas of the reflectors being different from one another in accordance with the distances of the reflectors from the lamp and the target plane.

2. A light source as in claim 1, in which the reflectors have concave surfaces.

3. A light source as in claim 1, in which the reflectors have spherical surfaces.

4. A light source as in claim 1, in which the reflectors are so shaped as to focus images of the lamp onto the target plane respectively.

5. A light source as in claim 1, in which a radius of curvature R of each reflector is $$R = 2ab/(a+b)$$

where $a$ is a distance from the respective reflector to the lamp and $b$ is a distance from the respective reflector to the target plane.

6. A light source as in claim 1, in which the light receiving frontal area of each reflector is proportional to a square of a distance from the respective reflector to the lamp.

7. A light source as in claim 1, further comprising a diffuser plate disposed between the support member and the target plane extending parallel to the target plane.

8. A light source as in claim 7, in which densities of portions of the diffuser plate are selected in accordance with amounts of light reflected thereto from the respective reflectors so that amounts of light passing through the portions to the target plane are equal.

9. A light source as in claim 1, further comprising an aperture plate disposed between the support member and the target plane extending parallel to the target plane, the aperture plate being formed with a plurality of aperture aligned with light reflected therethrough from the respective reflectors to the target plane.

10. A light source as in claim 9, in which areas of the apertures are selected in accordance with amounts of light reflected thereto from the respective reflectors so that amounts of light passing through the apertures to the target plane are equal.

11. A light source as in claim 1, in which the reflectors are arranged to reflect light therefrom to the target plane in such a manner as to form a rectangular pattern of images of the lamp on the target plane.

12. A light source as in claim 1, in which the surface of the support member is formed of a light absorbing material.

* * * * *